June 28, 1966   A. M. A. MAILLET   3,257,907
SHAPING APPARATUS OF THE PANTOGRAPHIC-TYPE
Filed July 26, 1962   2 Sheets-Sheet 1
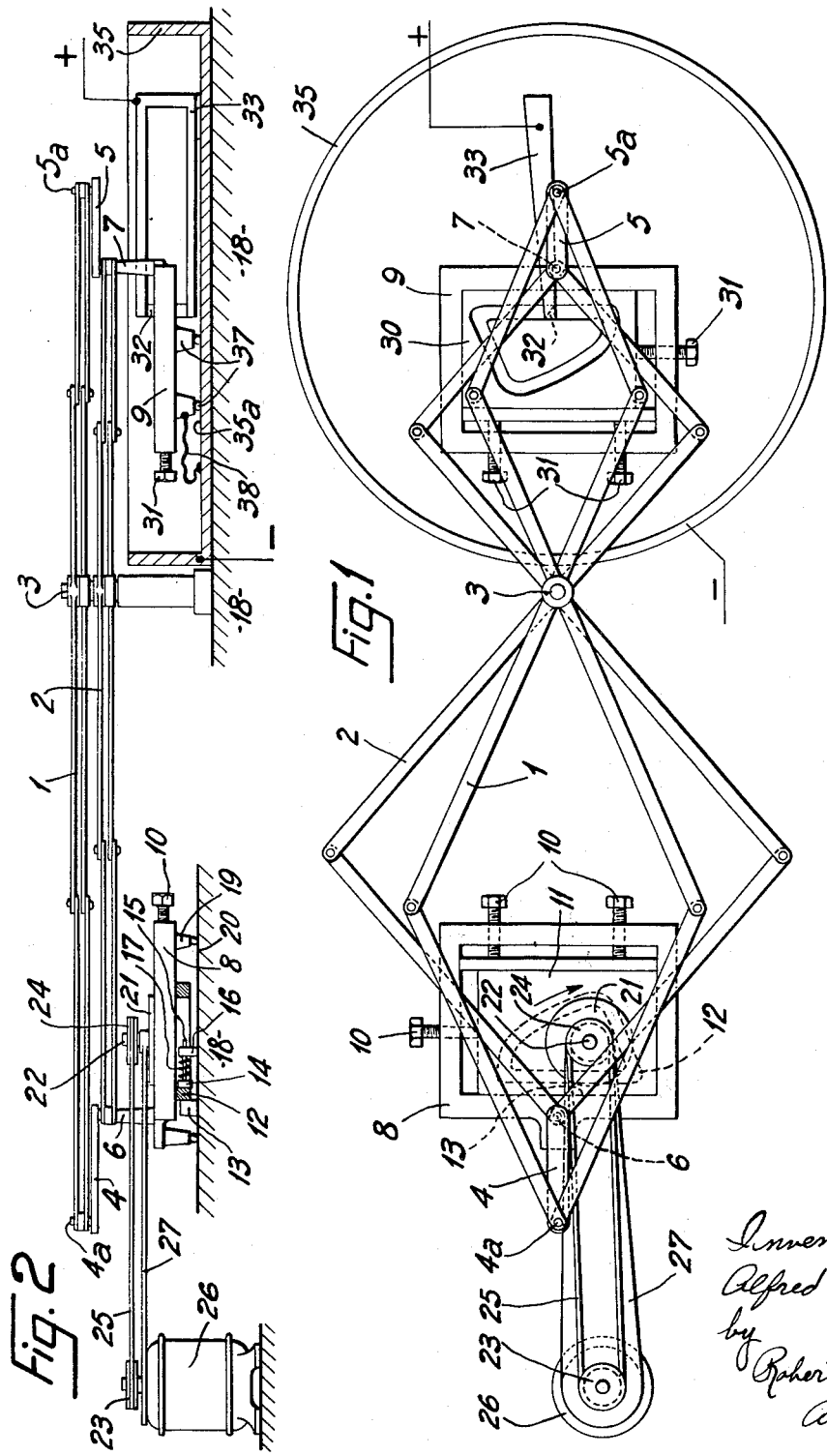

June 28, 1966  A. M. A. MAILLET  3,257,907
SHAPING APPARATUS OF THE PANTOGRAPHIC-TYPE
Filed July 26, 1962  2 Sheets-Sheet 2
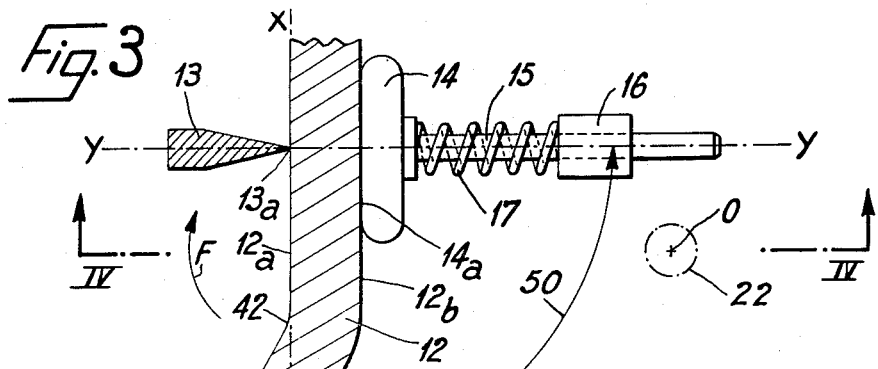
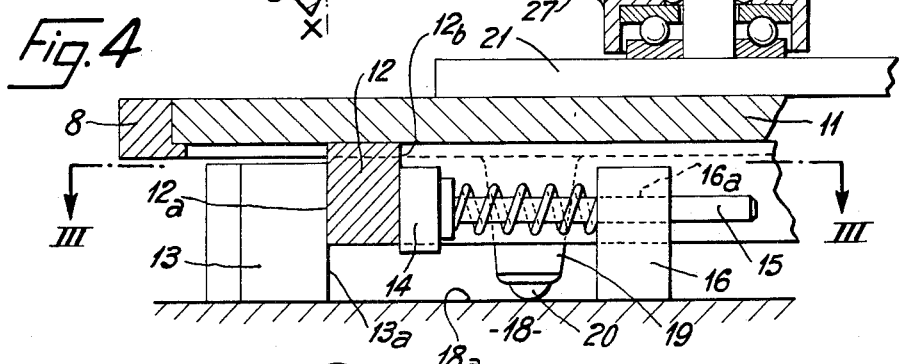
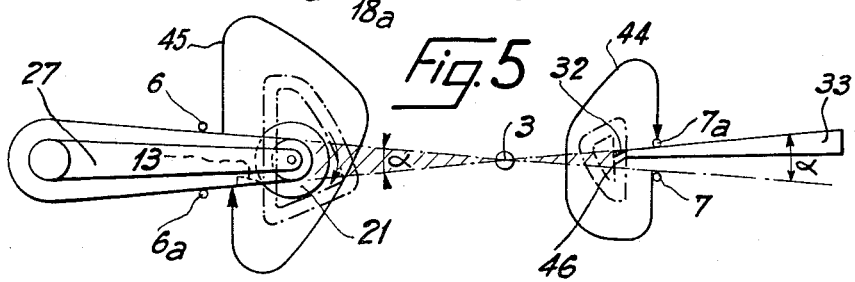
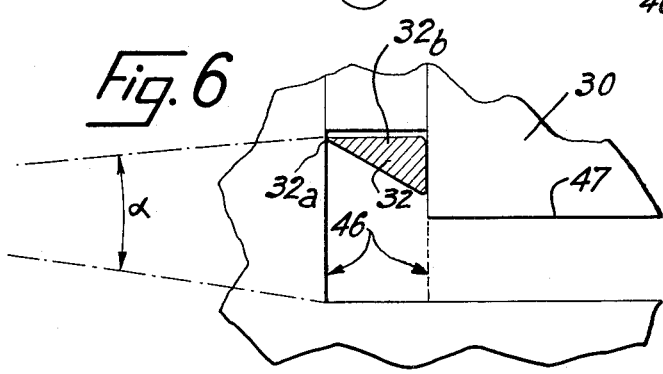
Inventor:
Alfred M. A. Maillet
by
Robert Henderson
Attorney United States Patent Office 3,257,907
Patented June 28, 1966

3,257,907
SHAPING APPARATUS OF THE
PANTOGRAPHIC-TYPE
Alfred M. A. Maillet, Versailles, Seine-et-Oise, France,
assignor to La Soudure Electrique Languepin, Paris,
France, a company of France
Filed July 26, 1962, Ser. No. 212,654
Claims priority, application France, July 26, 1961,
869,129
6 Claims. (Cl. 90—13.1)

The present invention relates to apparatus for shaping a workpiece in accordance with an internal or external profile or outline of a template and in particular for evolving such a workpiece from a blank according to such a profile or outline. The invention is particularly applicable to the manufacture of tools such as punches, dies and guides which are used in the stamping art.

The present invention is embodied in apparatus for shaping a workpiece wherein the workpiece and a flat template embodying the shaping outline or profile are interconnected during a shaping operation by means of a copying mechanism having a fixed center, and which constrains the workpiece to turn in direct correspondence with rotary motion given to the template by the friction of a disc rotating on a fixed axis and slidably held against said template. The outline of the template is in continuous contact with a fixed feeler and the shaping tool, which occupies a corresponding fixed position opposite to the position of the feeler element with reference to the mentioned fixed center, is in active shaping position in relation to the workpiece.

In such an arrangement, the turning workpiece describes with reference to the tool an outline identical with that of the turning template relative to the fixed feeler consequently, the tool cuts or shapes the workpiece in accordance with the outline of the template.

Furthermore, the shaping rate does not depend on the speed of rotation of the friction disc which provides the drive, since the latter slips or slides upon the template, when the tool does not perform its shaping function at a rate corresponding to the speed of said disc's rotation; on the contrary, the contact pressure of the tool on the workpiece depends essentially partly on the said speed of rotation, and partly on the frictional force exerted by the rotating driving disc, on the template. The proper relating of these two factors thus enables the device to be adjusted to the tool being used (miller, broach, machining electrode, abrasive cutting wire or erosion electrode, etc.), and to the hardness of the workpiece. The pressure of the driving disc against the template can be obtained merely by gravity; or it can be supplemented by the effect of magnetic, or electromagnetic attraction.

It is also possible to modify the coefficient of friction between the template and the driving disc, for instance, by means of a natural resin to increase this coefficient of friction, or by using a lubricant to reduce it.

In a direction perpendicular to the planes of the template and the outline to be cut in the workpiece, the feeler and the tool respectively can have practically point contact; the feeler can be a blunt point, or the center of a roller running along the edge of the template; whereas the tool may, for instance, be an abrasive thread (or wire) or an electro-erosive wire. This arrangement, however, has inconveniences; firstly, accuracy is only approximate, since neither the feeler nor the tool really have point contact; secondly, since the setting of the template with reference to the feeler and consequently the setting of the tool with reference to the workpiece are not definitive, the shaping or cutting operations can only be executed in the direction perpendicular to the plane of the template and the outline or profile cut in the workpiece.

In particular, it is not possible to obtain by the just detailed means a workpiece of externally or internally tapering shape; i.e., one in which the sections through planes parallel to the outline remain similar but vary in dimensions.

In order to remedy this in an advantageous form of embodiment of the invention, the template is in the form of a band or strip, one face whereof precisely embodies the shape and tape (if any) of the outline to be formed, while the opposite face thereof is at least substantially parallel to the former; the feeler being in the form of a knife blade, against the edge of which said one face of the template is pressed by means of a block or shoe bearing yieldably against said opposite face.

In this case, the shaping tool has an edge positioned similarly to the edge of the knife-blade and which shapes the workpiece to the required profile.

An embodiment of the invention will now be described, by way of example, with reference to the accompanying drawings, in which:

FIG. 1 is a plan view of an arrangement according to the invention;

FIG. 2 is a partially sectional elevation thereof;

FIG. 3 is an enlarged, fragmentary diagrammatic plan view of the knife blade and its associated shoe or block as viewed from the line III—III of FIG. 4;

FIG. 4 is a view along the line IV—IV of FIG. 3;

FIG. 5 is a diagrammatic plan view of the arrangement for machining or shaping a closed profile or outline;

FIG. 6 is a diagrammatic plan view of a machining or shaping electrode.

The device as shown in FIGS. 1 and 2 comprises two rhomboid linkages 1 and 2 having a common fixed center 3. The free ends of the linkages are hinged by the pivots 4a and 5a on rigid, integral extensions 4 and 5 of pivot posts 6 and 7 for the linkage 1 and on the pivot posts 6 and 7 for the linkage 2, the pivot posts being fixed on the rectangular frames 8 and 9 which respectively carry the template and the workpiece.

The frame 8 embraces, and holds by means of bolts 10, a plate 11, fixedly carrying on its lower face the detachable template 12 which is cemented, welded or screwed on to this plate.

This template is a band or strip forming a profile or outline which may be closed or open; one of its faces 12a (FIG. 3) being given exactly the shape to be imparted to the workpiece; a second face 12b of the template being substantially parallel to the face 12a.

The face 12a is in contact with the sharp edge 13a of a knife-blade 13 rigidly attached to the base 18 of the device.

The other face 12b is in contact with the face 14a of a block or shoe 14 which is yieldably urged towards the knife-blade 13 by a spring 17 extending about a rod 15 passing through a bore 16a in a saddle 16 rigidly fixed upon the base 18 of the device.

The spring 17, through the shoe 14, continuously presses the face 12a of the template against the knife-blade 13; the face 14a of the shoe being perpendicular to the direction of this knife.

The frame 8 is movable in all directions in a plane parallel to the flat top surface 18a (FIG. 4) of the base 18 as it is provided with bearing feet 19 each having at the end a ball 20 rolling upon the said flat surface.

The upper flat face of the plate 11 flush with this frame supports the driving disc 21 which is mounted on the spindle 22 and rotated through the intermediary of the pulleys 23 and 24 and the belt 25 by the motor 26.

The spindle 22 is supported in a bearing carried at the end of a non-rotary arm 27 in the form of a narrow and flexible steel blade in such manner that the weight of the disc 21 is continuously applied against the frame 8 and the plate 11. In addition, the disc 21 may be magnetized, or may carry an electromagnet in such manner that the force with which this disc bears against the plate 11 may be augmented as necessary. As will be seen in FIG. 2, the rotating disc and its driving means are located between the linkages 1 and 2 and the frame 8, respectively, while the assembly 13–16 which follows the outline or shape of the template is arranged underneath the frame 8 and the plate 11.

The workpiece to be shaped is mounted inside the frame 9, for instance, as represented by the plate 30 attached to said frame by means of the bolts 31.

Over this plate travels the shaping tool, in the present instance an erosion electrode 32, the edge 32a whereof (FIG. 6) is similarly but oppositely poistioned with respect to the linkage mechanism centered at 3 and formed by the linkages 1 and 2, as is the knife edge 13a. This electrode is carried in a conducting holder 33 of U shape, fixed upon the base 18 but insulated therefrom.

The frame 9 is capable of motion in all directions in a plane parallel to the plane of movement of frame 8 and to the bottom 35a of a vat 35 on which it rests with two ball-feet 37, similar to the feet 19, 20. A flexible conductor 38 connects the workpiece 30 to earth, through the frame 9, the vat 35 and an indicated negative lead. A suitable positive lead (not shown) is connected to the electrode and to a suitable source of electric energy in a well-understood manner.

The vat 35 contains a liquid dielectric if shaping is to be done by spark erosion; or with a suitable electrolyte, if the erosion is to be performed by electrolysis.

The device which has been described above operates in the following manner:

When rotated, the driving disc 21 turns the plate 11, causing the template band 12 to slide between the knife-blade 13 and the shoe 14. Consequently, successive points on the face 12a which are contacted by the edge 13a of the knife-blade 13, by virtue of the connecting, copying linkage, correspond to successive points on a profile to be shaped in the workpiece 30.

As the edge 13a of the knife-blade slides along the face 12a of the rotating template, the face 32b of the electrode 32 shapes in the workpiece plate 30, a slit corresponding to the said outline.

Thus, the electrode, or any other equivalent tool, progressively shapes in the plate 30 an outline or profile corresponding to that of the template, the dimensions whereof correspond to the trace of 12a, at a scale depending on the copying ratio of the linkages. It will be seen that:

The outline of the face 12a about the template may be either an external or an internal profile. However, if the profile is a closed one, it is advisable to place the spindle 22 of the driving disc inside this profile: i.e., preferably, to make the face 12a follow an external outline.

The outline of face 12b on which the face 14a of the shoe 14 travels need only be approximately parallel to the outline of face 12a; in particular, at the angles of the profile, the outline 12b can be rounded off as necessary to permit the shoe to function as described.

In these conditions, the center 0 of the spindle 22 is suitably located (FIGS. 3 and 4) on the side opposite to the knife-blade 13, with reference to the projected line XX at the face 14a of the shoe, adjacent to the knife edge 13a, i.e., towards the center of the mean curvature of the outline of the face 12a of the template.

Furthermore, if the disc 21 and consequently the template 12 are rotated in the sense of the arrow F (FIGS. 3 and 5), the face 12a, whatever its shape, i.e., even if it has reentrant angles as shown at 42 in FIG. 3, will be properly driven if the center 0 is, with reference to the direction of movement of the face 12a, disposed behind the straight line YY perpendicular to XX and passing through the edge 13a of the knife 13. Finally the center 0 is advantageously disposed within the angle 50 indicated in FIG. 3.

Provided that the edge 32a is the counterpart, in the copying linkage, of the edge 13a of the knife-blade, the former edge will also be able to describe either an external or an internal profile: i.e., shape a male element profiled to a required outline, or shape inside a female element an opening having the same outline.

In view of the interference, during operation, of the pivot post 6 with the arm 27, and/or of pivot post 7 with the upper arm of the electrode holder 33 it will not be possible for the device to describe the entire outline of a closed profile. However, as shown in FIG. 5, it will be possible for the shaping tool to describe all except a very small part of such a closed outline.

In this regard, the upper arm of the U-shaped holder 33 and the arm 27 of the saddle carrying the driving transmission of the disc 21, respectively prevent the pivot posts 7 and 6 from passing beyond their respective positions 7a and 6a (FIG. 5). In the remainder of their paths, indicated by the irregularly curved arrows 44 and 45, the pivot posts encounter no obstacles.

To reduce to a minimum the angle $\alpha$ within which the device is inoperative, the holder 33 and the arm 27 are located in the same plane and are furthermore diametrically opposed with reference to the fixed center 3—the common linkage center of the two linkages.

However, as shown in FIGS. 1 and 5, the holder 33 and the arm 27 may advantageously be tapered in plan toward the center 3, as permitted by the strength of their materials.

It is, however, necessary that at the origin or starting point of a closed profile, which may be located anywhere on its outline, the electrode 32 shall be located at a point on the plate 30 corresponding to the point at which the knife-blade 13 is to start its travel relatively to the template 12. Having located this starting point, an opening 46 is there made in the plate 30 of a size corresponding to the width, at that point, of the angle $\alpha$ within which shaping by the disclosed apparatus is not possible. Then, after rotation of the template and the workpiece to the extent to which such rotation is unobstructed by the arm 27 and the electrode holder 33 the shaping will have been performed over the whole outline.

If the outline to be shaped is an external, closed outline, a slit 47 (FIG. 6) made within the angle $\alpha$ will enable the electrode to enter freely into the opening 46.

The electrode 32 may be set perpendicularly to the plate 30; or slanted with reference thereto, the rectilinear continuation of the edge 32a intersecting the continuation of the axis of the pivot center 3. Consequently, since the knife-edge 13 is set perpendicularly to the shaping profile, the edge or tip of the electrode, or other shaping tool, cuts in the workpiece a tapered face, all parts of which are equally inclined to the plan surface of the plate 30.

What I claim is:

1. A shaping apparatus comprising a fixed pivot; at least two similar linked pantographs having centers carried by said pivot and each comprising a pair of conjugate pivots; a template carrier adapted for free displacement in all directions with respect to a first plane and having a flat surface parallel to said plane; means for pivotally connecting one conjugate pivot of each of said linked pantographs to spaced points of said template carrier; a template including a substantially closed flat contour carried by said template carrier with said flat contour parallel to said flat surface; a fixed feeler contacting one side face of said contour; yielding means acting on an opposite side face of said contour for urging said feeler against said one side face; a workpiece carrier adapted for free displacement in all directions with respect to a second plane parallel to the said first plane; means for connecting the second conjugate pivot of each of said pantographs to spaced points of said workpiece carrier conjugated with the corresponding said spaced points of said template carrier; a tool adapted for shaping said workpiece, fixed in a position conjugated with the position of said feeler with respect to said fixed pivot; and a rotating friction member engaging said flat surface of said template carrier for driving thereof.

2. A shaping apparatus according to claim 1, in which said feeler has the shape of a flat knife and said yielding means are associated with said feeler for urging the edge of said knife perpendicularly to said one side face of the contour and wherein said tool comprises a working edge conjugated with said knife edge.

3. A shaping apparatus according to claim 1, wherein said planes are horizontal and said flat surface upwardly directed and wherein said rotating friction member is a disc carried by a vertical shaft and the apparatus further comprising a bearing for said vertical shaft; means for supporting said bearing in stationary relationship with respect to a horizontal plane and yieldably in vertical direction; and stationary driving means for rotating said shaft.

4. A shaping apparatus according to claim 3, wherein said feeler is a vertical flat knife contacting said one side face of the contour along said knife's edge and wherein the horizontal location of said vertical shaft with respect to said flat knife is beyond the edge thereof and on the side thereof encountered by the rotating displacement of the disc.

5. A shaping apparatus comprising a pair of pantographs, both pivotable in parallel, operational planes relatively to a fixed center about which links of the pantograph pivot, and each pantograph having motion-duplicating pivots at opposite sides of said center; a frame at each of opposite sides of said center, each frame being adapted for roundabout movement in a plane parallel to said operational planes; the motion-duplicating pivots of the two pantographs at each side of said center being pivotally connected at spaced points to the frame which is located at the corresponding side of said center; a template fixed to one of said frames and having a profile extending in parallelism to the plane of movement of said one frame; a fixed feeler; frame-actuating means, independent of said pantographs, for imparting said roundabout movement to said one frame and, through said pantographs, a similar roundabout movement of the other of said frames; means for maintaining said profile in contact with said feeler during said movement of said one frame; and a shaping tool fixed in such relation to said other frame as to be capable of performing a shaping operation on a workpiece fixed to said other frame to form on the workpiece, during said movement of the frames, a profile similar to said profile of the template.

6. A shaping apparatus according to claim 5, said one of the frames having a flat top surface parallel to said planes and the template being at the underside of said one frame; said frame-actuating means comprising a driven rotary disc, supported on said flat surface, frictionally to impart an angular component of motion to said one frame to move said profile of the template linearly of said feeler whereby to control the movement of the two frames in conformity with the shape of the template's profile.

References Cited by the Examiner
UNITED STATES PATENTS

| 1,229,111 | 6/1917 | MacDonald | 33—25 |
| 2,466,178 | 4/1949 | MacKenzie | 33—32 |
| 2,491,469 | 12/1949 | Andersen | 33—23 |
| 2,939,825 | 6/1960 | Faust et al. | 204—224 X |

WILLIAM W. DYER, JR., *Primary Examiner.*

JOHN H. MACK, *Examiner.*

A. B. CURTIS, G. A. DOST, *Assistant Examiners.*